(12) United States Patent
Guen et al.

(10) Patent No.: US 9,461,295 B2
(45) Date of Patent: Oct. 4, 2016

(54) RECHARGEABLE BATTERY INCLUDING TERMINAL PORTION HAVING AUXILIARY PLATE FOR REDUCING CURRENT FLOW ALONG SHORT CIRCUIT CURRENT PATH

(75) Inventors: Min-Hyung Guen, Yongin-si (KR); Yong-Chul Seo, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 296 days.

(21) Appl. No.: 13/609,912

(22) Filed: Sep. 11, 2012

(65) Prior Publication Data

US 2013/0295420 A1 Nov. 7, 2013

Related U.S. Application Data

(60) Provisional application No. 61/643,130, filed on May 4, 2012.

(51) Int. Cl.
| | | |
|---|---|---|
| *H01M 2/06* | (2006.01) | |
| *H01M 2/08* | (2006.01) | |
| *H01M 2/22* | (2006.01) | |
| *H01M 10/42* | (2006.01) | |

(Continued)

(52) U.S. Cl.
CPC ............. *H01M 2/22* (2013.01); *H01M 2/0285* (2013.01); *H01M 2/043* (2013.01); *H01M 2/0426* (2013.01); *H01M 2/0473* (2013.01); *H01M 2/30* (2013.01); *H01M 10/42* (2013.01); *H01M 10/0413* (2013.01); *H01M 10/058* (2013.01); *H01M 10/0525* (2013.01); *H01M 10/0565* (2013.01); *Y02T 10/7011* (2013.01)

(58) Field of Classification Search
CPC .......... H01M 2/22; H01M 2/30; H01M 2/34; H01M 10/0525; H01M 10/0565; H01M 10/058; H01M 10/0413
USPC .................................. 429/61, 179, 180, 181
See application file for complete search history.

(56) References Cited

U.S. PATENT DOCUMENTS

| | | | |
|---|---|---|---|
| 7,824,798 | B2 | 11/2010 | Bang |
| 2005/0123824 | A1 | 6/2005 | Ishikawa et al. |

(Continued)

FOREIGN PATENT DOCUMENTS

| | | |
|---|---|---|
| CN | 102187504 A | 9/2011 |
| CN | 102386435 A | 3/2012 |

(Continued)

OTHER PUBLICATIONS

Extended European Search Report dated Mar. 13, 2013 for EP Application No. 12186478.9 (4 pages).

(Continued)

*Primary Examiner* — Sean P Cullen
(74) *Attorney, Agent, or Firm* — Lewis Roca Rothgerber Christie LLP (57) ABSTRACT

A rechargeable battery is provided. The rechargeable battery includes a case, an electrode assembly in the case, a cap plate sealing an opening of the case, and a terminal portion attached to the cap plate. The terminal portion includes a terminal plate on the cap plate and electrically connected to the electrode assembly, and an auxiliary plate electrically connecting the cap plate to the terminal plate. The auxiliary plate has a plurality of openings for reducing a current flow along a short circuit current path.

20 Claims, 8 Drawing Sheets

(51) Int. Cl.
*H01M 2/30* (2006.01)
*H01M 2/02* (2006.01)
*H01M 2/04* (2006.01)
*H01M 10/04* (2006.01)
*H01M 10/0525* (2010.01)
*H01M 10/0565* (2010.01)
*H01M 10/058* (2010.01)

(56) References Cited

U.S. PATENT DOCUMENTS

| | | |
|---|---|---|
| 2009/0311607 A1 | 12/2009 | Han et al. |
| 2011/0039136 A1* | 2/2011 | Byun et al. ............ 429/56 |
| 2011/0123838 A1 | 5/2011 | Lee et al. |
| 2011/0183166 A1 | 7/2011 | Suga et al. |
| 2011/0183182 A1 | 7/2011 | Woehrle et al. |
| 2012/0052341 A1* | 3/2012 | Kim et al. ............ 429/53 |

FOREIGN PATENT DOCUMENTS

| | | |
|---|---|---|
| EP | 2 043 180 A1 | 4/2009 |
| JP | 2005-216824 | 8/2005 |
| KR | 10-2006-0011311 | 2/2006 |
| WO | WO 2005/117196 A1 | 12/2005 |
| WO | WO 2009/078584 A1 | 6/2009 |
| WO | WO 2010046745 A1 * | 4/2010 |

OTHER PUBLICATIONS

Full English Machine Translation of JP 2005-216824, 7 pages.
SIPO Office action dated Mar. 29, 2016, for corresponding Chinese Patent application 201310096616.9, (6 pages).

* cited by examiner

RECHARGEABLE BATTERY INCLUDING TERMINAL PORTION HAVING AUXILIARY PLATE FOR REDUCING CURRENT FLOW ALONG SHORT CIRCUIT CURRENT PATH

CROSS-REFERENCE TO RELATED APPLICATION

This application claims priority to and the benefit of U.S. Provisional Application No. 61/643,130, filed on May 4, 2012, in the U.S. Patent and Trademark Office, the entire content of which is incorporated herein by reference.

BACKGROUND

1. Field

Aspects of embodiments of the present invention relate generally to a rechargeable battery.

2. Description of the Related Art

A rechargeable battery differs from a primary battery in that it can be repeatedly charged and discharged, while the latter makes only the irreversible conversion of chemical to electrical energy. The low-capacity rechargeable battery is used as the power supply for small electronic devices, such as cellular phones, notebook computers, and camcorders, while the high-capacity rechargeable battery is used as the power supply for driving motors in hybrid vehicles and the like.

A high-power rechargeable battery using a non-aqueous electrolyte with a high energy density has been recently developed. For example, the high-power rechargeable battery is constructed with a plurality of rechargeable cells coupled to each other in series such that it can be used as the power supply for driving motors in electric vehicles requiring high power. The rechargeable battery may, for instance, have a cylindrical shape or a prismatic shape.

An electrode assembly of the rechargeable battery may be received in a case formed in the shape of a cylinder or a prism such that the electrode assembly can be prevented from being damaged due to foreign materials. However, when a conductive foreign material (e.g., a conductive nail) penetrates the case and the electrode assembly, a negative electrode and a positive electrode that form the electrode assembly may be short-circuited.

In addition, when the rechargeable battery has a structure including a case formed of a conductive material and a terminal electrically connected to the case, a short-circuit may occur between the negative electrode and the positive electrode due to the conductive foreign material penetrating the electrode assembly through the case. As a result, a current path may be formed between the conductive foreign material, the case, and the terminal.

Accordingly, when a current discharged to the outside of the case through the terminal of the electrode assembly returns to the conductive foreign material penetrating the electrode assembly in the case, an excessive amount of current flows to the conductive foreign material such that heat or arcing generated in the conductive foreign material may cause damage to the electrode assembly or battery environment.

The above information disclosed in this Background section is only for enhancement of understanding of the background of the described technology and therefore it may contain information that does not form the prior art that is already known in this country to a person of ordinary skill in the art.

SUMMARY

Aspects of embodiment of the present invention are generally directed toward a rechargeable battery and more particularly, to a rechargeable battery having an improved terminal portion. Further aspects are directed toward a rechargeable battery including a structure that can lessen or minimize the amount of discharged current returning to the rechargeable battery by penetration of a conductive foreign material. Still further aspects are directed toward a rechargeable battery including an auxiliary plate along a short circuit current path, the auxiliary plate having a plurality of openings (for example, numerous small holes or grooves, such as dozens or hundreds of openings) for allowing the auxiliary plate to consume significant amounts of short circuit current (i.e., reduce the current flow along the short circuit current path).

In an exemplary embodiment of the present invention, a rechargeable battery is provided. The rechargeable battery includes a case, an electrode assembly in the case, a cap plate sealing an opening of the case, and a terminal portion attached to the cap plate. The terminal portion includes a terminal plate on the cap plate and electrically connected to the electrode assembly, and an auxiliary plate electrically connecting the cap plate to the terminal plate. The auxiliary plate has a plurality of openings for reducing a current flow along a short circuit current path.

The plurality of openings may be holes in the auxiliary plate.

The auxiliary plate may have a mesh structure.

The mesh structure may include a plurality of mesh strands defining the holes.

The mesh strands may have a uniform thickness.

The terminal portion may further include a reinforcement plate for reinforcing a mechanical strength of the mesh structure.

The reinforcement plate may be configured to dissipate heat generated in the mesh structure.

The reinforcement plate may be between the auxiliary plate and the terminal plate.

The reinforcement plate may mate flush with the terminal plate.

The plurality of openings may be grooves in the auxiliary plate.

Each of the grooves may have a quadrilateral shape on a surface of the auxiliary plate.

The grooves may include top portions and recessed portions. The top portions may form a level mating surface facing the terminal plate.

The auxiliary plate may mate flush with the terminal plate.

The auxiliary plate may mate flush with the cap plate.

The auxiliary plate may be electrically connected to the case.

The short circuit current path may be between the case and the electrode assembly.

A surface of the auxiliary plate facing the terminal plate may be at least as large as a surface of the terminal plate facing the auxiliary plate.

The plurality of openings may include at least 50 openings.

The terminal plate may have a level mating surface facing the cap plate.

The auxiliary plate may have a level mating surface facing the cap plate.

The terminal plate may be only electrically connected to the cap plate via the auxiliary plate.

The terminal plate may be a positive terminal plate and electrically connected to the case.

The terminal portion may further include a terminal member electrically connecting the terminal plate to the electrode assembly, and a terminal gasket electrically insulating the terminal member from the cap plate except via the terminal plate.

A rechargeable battery according to an exemplary embodiment includes a case, an electrode assembly received in the case, a cap plate sealing an opening of the case, and a terminal portion provided in the cap plate to be electrically connected to the electrode assembly. The terminal portion includes an auxiliary plate provided on the cap plate and formed of a conductive material, and a terminal plate combined with the auxiliary plate. A plurality of holes is formed in at least a part of the auxiliary plate.

According to an exemplary embodiment, the amount of discharged current from the rechargeable battery returning to the conductive foreign material penetrating the rechargeable battery can be reduced, and therefore damage to the rechargeable battery or surroundings due to heat or arcing can be reduced or prevented.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. It will be understood that one layer or element that is said to be "on" another layer or base may be directly on the other layer or base, or may have another layer or layers interposed therebetween. It will also be understood that one layer that is said to be "under" another layer may be directly under the other layer or have at least one other layer interposed therebetween. Further, it will be understood that one layer that is said to be "between" two other layers may be the only layer between the two layers or may have at least one or another layer inserted therebetween. In addition, like reference numerals designate like elements throughout the present specification and drawings.

Figure 1:
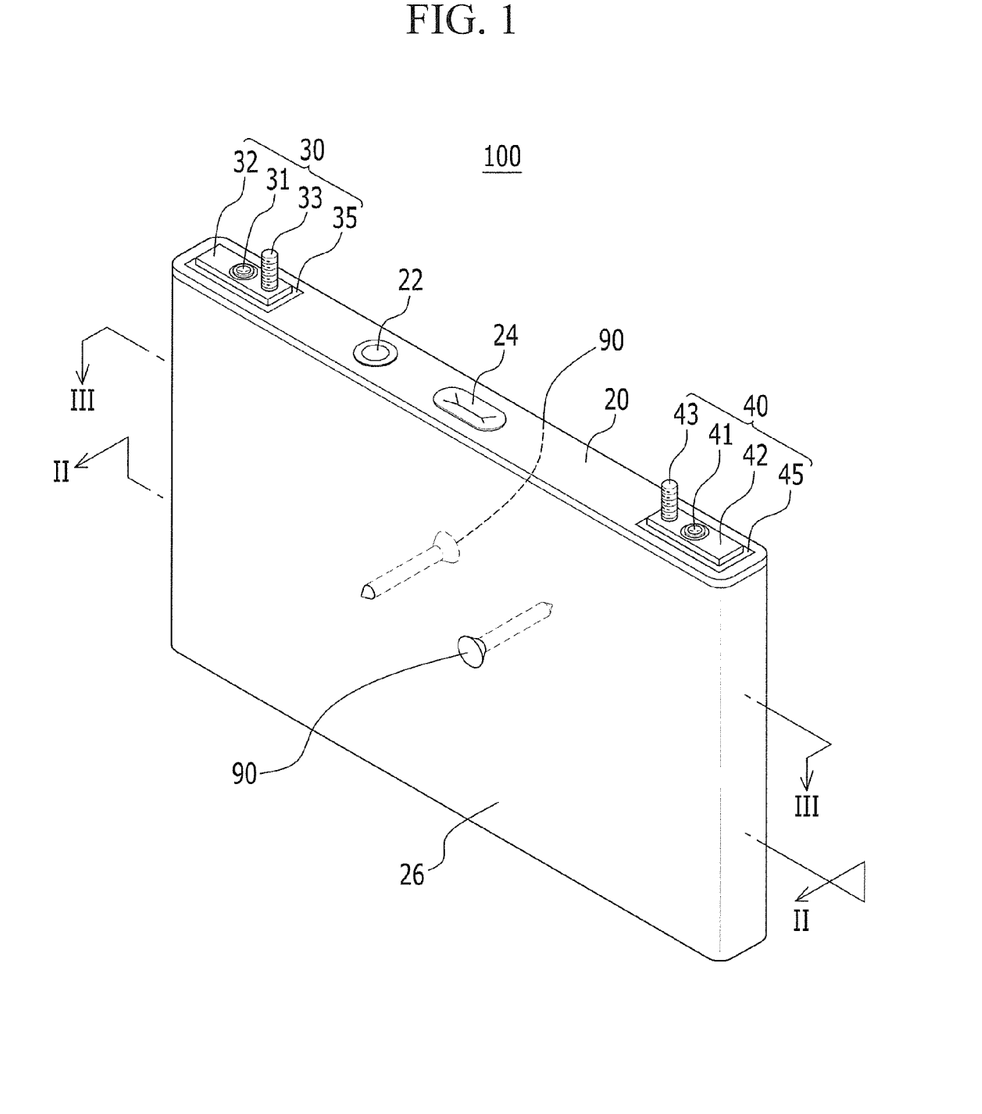
FIG. 1 is a perspective view of a rechargeable battery penetrated by a conductive foreign material according to a first exemplary embodiment of the present invention.
Figure 2:
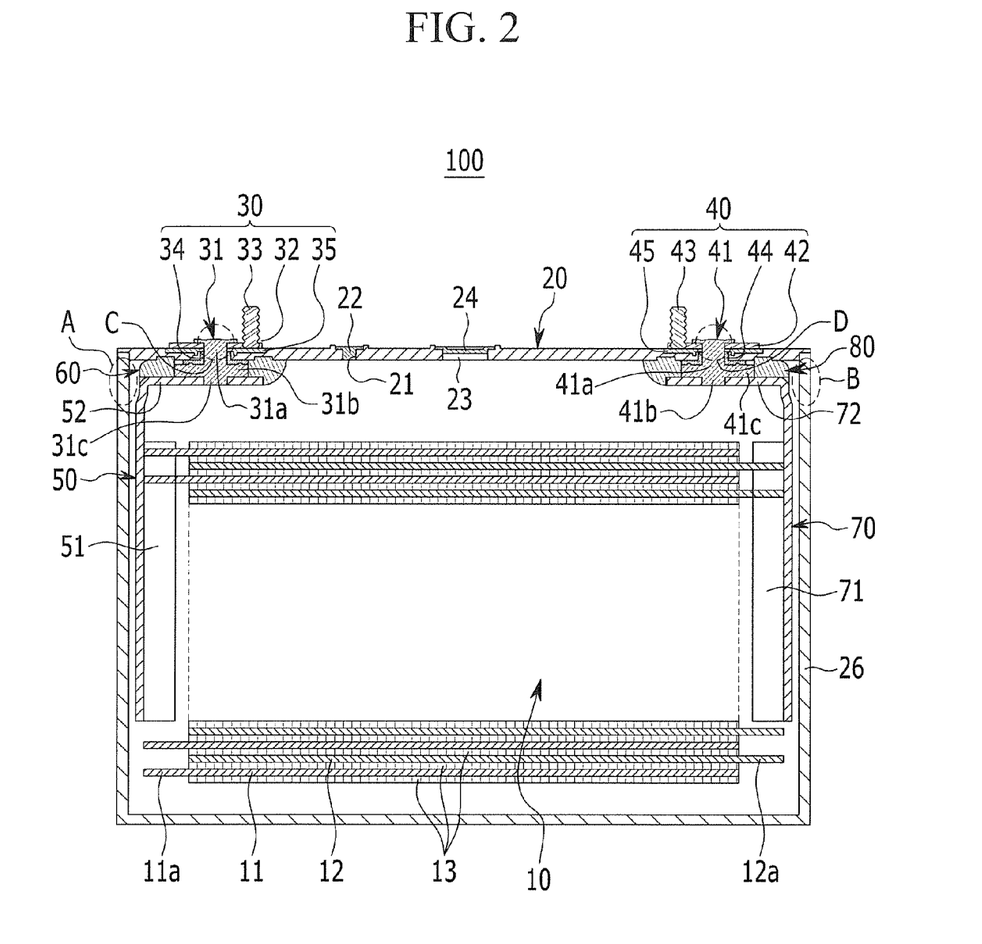
FIG. 2 is a cross-sectional view of FIG. 1, taken along the line II-II.

FIG. 1 is a perspective view of a rechargeable battery 100 penetrated by a conductive foreign material 90 according to a first exemplary embodiment of the present invention. FIG. 2 is a cross-sectional view of FIG. 1, taken along the line II-II.

Referring to FIG. 1 and FIG. 2, the rechargeable battery 100 includes an electrode assembly 10, a case 26 in which the electrode assembly 10 is inserted, first and second terminal portions 30 and 40 electrically connected to the electrode assembly 10, a cap plate 20 coupled to an opening formed in the case 26, and first and second lower insulation members 60 and 80 provided in the case 26. Here, the electrode assembly 10 is formed by spirally winding a first electrode 11 and a second electrode 12, interposing a separator 13 therebetween.

The rechargeable battery 100 is exemplarily illustrated as an angular lithium ion rechargeable battery. However, the present invention is not limited thereto, and the present invention may be applied to a lithium polymer battery and the like. In addition, the first electrode 11 may be formed as a negative electrode and the second electrode 12 may be formed as a positive electrode, or the first electrode 11 may be formed as a positive electrode and the second electrode 12 may be formed as a negative electrode. However, for better comprehension and ease of description, the first and second electrodes 11 and 12 will be described instead of the negative and positive electrodes.

The electrode assembly 10 may be formed in the shape of a jellyroll by spirally winding the first electrode 11 and the second electrode 12, together with the separator 13. Each of the first electrode 11 and the second electrode 12 may include a current collector formed of thin film metal foil and an active material coated on the surface of the current collector. In addition, the first electrode 11 and the second electrode 12 may be partitioned into a coated region where the current collector is coated with the active material and first and second uncoated regions 11a and 12a where the current collector is not coated with the active material. The coated region forms most of the first and second electrodes 11 and 12 in the electrode assembly 10, and the first and the second electrode uncoated regions 11a and 12a may be respectively disposed in a jellyroll state on both ends of the coated regions.

However, the present invention is not limited thereto, and the electrode assembly 10 may have a structure in which first and second electrodes 11 and 12 formed of a plurality of sheets are stacked, interposing a separator 13 therebetween.

A first terminal portion 30 is electrically connected to the first electrode uncoated region 11a of the electrode assembly 10 through a first current collecting member 50, and a second terminal portion 40 is electrically connected (e.g., along an electrical power current path) to the second electrode uncoated region 12a through a second current collecting member 70.

The case 26 may be formed in the shape of a cuboid. An opening is formed on one side of the case 26. However, the present invention is not limited thereto, and the case may have various shapes such as a cylindrical shape, a pouch shape, and the like.

A cap plate 20 may be formed of a thin plate, and may be coupled to the opening of the case 26 to seal the opening. In addition, an electrolyte injection opening 21 for injection of an electrolyte solution into the sealed case 26 may be formed in the cap plate 20. The electrolyte injection opening 21 may be sealed by a sealing cap 22 after injection of the electrolyte solution. Further, a vent hole 23 where a vent plate 24 is formed may be formed in the cap plate 20. The vent plate 24 may be ruptured when an internal pressure of the sealed case 26 is higher than a set pressure (for example, a predetermined pressure).

The first and second terminal portions 30 and 40 may respectively include first and second terminal members (for example, first and second rivets 31 and 41), first and second terminal plates 32 and 42, first and second terminal connection pillars 33 and 43, first and second gaskets (or terminal gaskets) 34 and 44, and a terminal insulation members 35 and an auxiliary plate 45.

In further detail, the first and second rivets 31 and 41 may respectively include first and second pillar portions 31a and 41a, first and second flange portions 31b and 41b, and first and second combining protrusions 31c and 41c. Accordingly, the first and second combining protrusions 31c and 41c of the first and second rivets 31 and 41 may be respectively coupled to the first and second current collecting members 50 and 70 so that the first and second rivets 31 and 41 can be electrically connected to the first and second current collecting members 50 and 70.

The first and second terminal plates 32 and 42 may be electrically connected to the first and second rivets 31 and 41 by being coupled thereto, and the first and second terminal connection pillars 33 and 43 may be coupled to the first and second terminal plates 32 and 42. Thus, the first and second rivets (or terminal members) 31 and 41 electrically connect (e.g., along an electrical power current path) the electrode assembly 10 to the first and second terminal plates 32 and 42. The first and second gaskets 34 and 44 may insulate the first and second rivets 31 and 41 from the cap plate 20 by being provided between the first and second rivets 31 and 41 and the cap plate 20.

The terminal insulation member 35 may be provided between the first terminal plate 32 and the cap plate 20 for insulation therebetween. The auxiliary plate 45 may be provided between the second terminal plate 42 and the cap plate 20. To increase surface contact between the parts, the second terminal plate 42 and the auxiliary plate 45 may have a level mating surface facing the cap plate 20.

Here, the auxiliary plate 45 may be formed of a conductive material, and the cap plate 20 and the second current collecting member 70 can be electrically connected to each other through the auxiliary plate 45. In addition, the case 26 is electrically connected to the second electrode 12 through the cap plate 20 such that the case 26 may be positively or negatively charged (e.g., have a first polarity). Thus, a polarity (positive or negative) of the cap plate 20 (e.g., the first polarity) may be changed (e.g., to a second polarity different from the first polarity) according to a polarity (positive or negative) of the second electrode 12.

The first and second current collecting members 50 and 70 may respectively include first and second electrode combining portions 51 and 71 connected to the first and second electrodes 11 and 12 and first and second terminal combining portions 52 and 72 including first and second terminal combining grooves (at the first and second combining protrusions 31c and 41c) connected to the first and second terminal portions 30 and 40.

In addition, first and second lower insulation members 60 and 80 may be disposed adjacent to the cap plate 20 in the case 26. Here, the first terminal portion 30 may include a terminal (not shown) formed in the shape of a circular cylinder rather than a plate.

Figure 3:
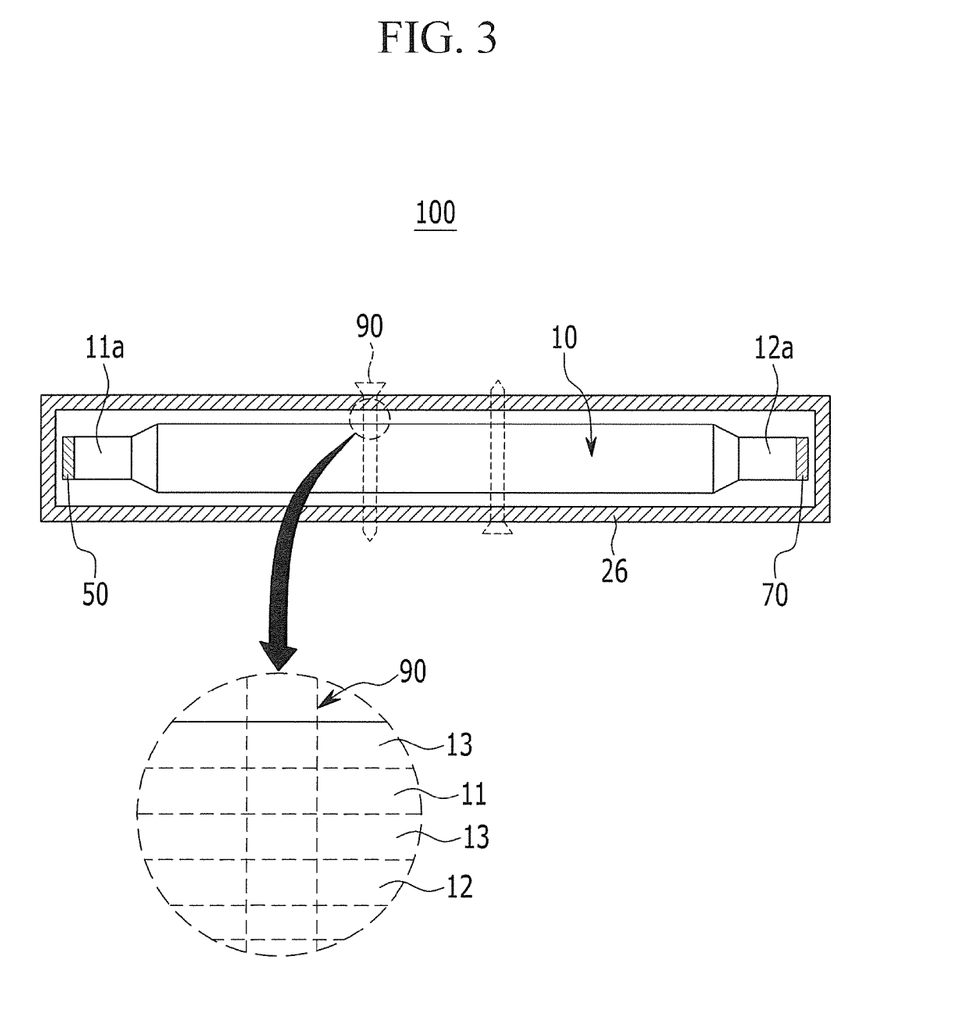
FIG. 3 is a cross-sectional view of FIG. 1, taken along the line III-III.
Figure 4:
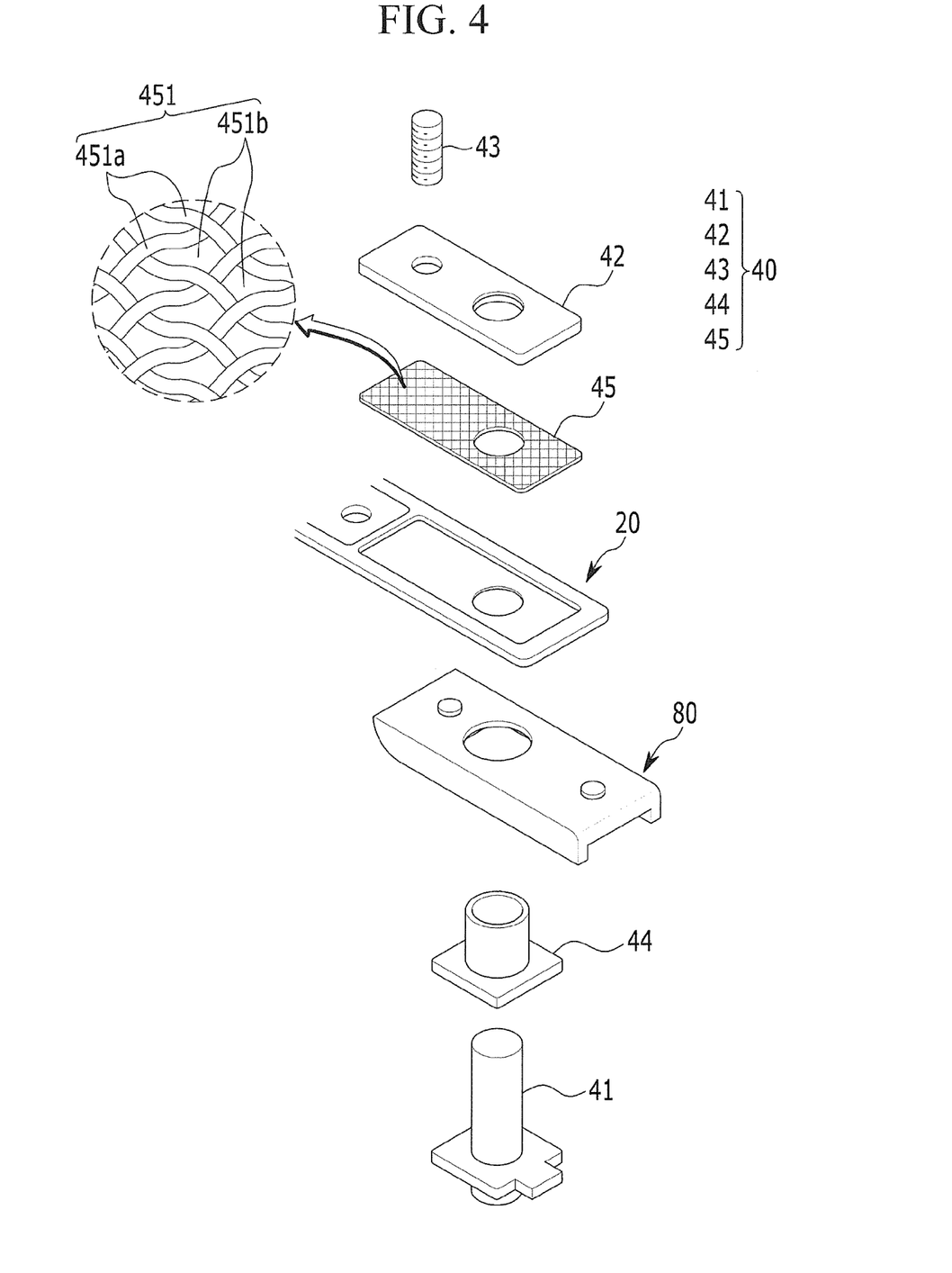
FIG. 4 is a partially exploded perspective view of the rechargeable battery of FIG. 1.

FIG. 3 is a cross-sectional view of FIG. 1, taken along the line III-III. FIG. 4 is a partially exploded perspective view of the rechargeable battery of FIG. 1.

Hereinafter, the rechargeable battery 100 of FIG. 1 will be described with reference to FIG. 3 and FIG. 4. Referring to FIG. 3, the first electrode 11 may be disposed in an external surface of the electrode assembly 10. In addition, the first electrode 11 may be formed as a negative electrode, and the second electrode 12 may be formed as a positive electrode. Thus, the case 26 that is electrically connected to the second electrode 12 through the second terminal portion 40 may be positively charged, and the second terminal plate 42 may be a positive terminal plate that is electrically connected to the case 26. In addition, the positively charged case 26 and the negative first electrode 11 may be disposed opposite to each other, interposing the separator 13 therebetween.

However, the present invention is not limited thereto, and the first electrode 11 may be formed as a positive electrode and the second electrode 12 may be formed as the negative electrode. Thus, the case 26 that is electrically connected to the second electrode 12 through the second terminal portion 40 can be negatively charged.

Hereinafter, a current path formed between the case 26, the first electrode 11, the second terminal portion 40, and the conductive foreign material 90 due to penetration of the conductive foreign material 90 when the case 26 is positively charged will be described in further detail.

As shown in FIG. 3, the conductive foreign material 90 penetrating one side of the positively charged case 26 can sequentially penetrate the insulating separator 13 of the electrode assembly 10 and the negative first electrode 11. Here, the conductive foreign material 90 that penetrated the positively charged case 26 can be positively charged. Thus, when the conductive foreign material 90 penetrates the rechargeable battery 100, a current path through which a current continuously flows may be formed between the negative first electrode 11, the positively charged case 26, the positive charged conductive foreign material 90, and the second terminal portion 40 electrically connected to the positive second electrode 12. Thus, the internal current of the electrode assembly (or current collector) 10 may flow to the outside of the electrode assembly 10 through the second terminal portion 40 provided on the cap plate 20 of the case 26 from the negative first electrode 11, and may flow into the electrode assembly 10 through the conductive foreign material 90, using the case 26 as a medium.

Referring to FIG. 4, the auxiliary plate 45 formed of the conductive material of the second terminal portion 40 may include a mesh structure 451 and be made of one of stainless and aluminum. In further detail, the mesh structure 451 may be formed of a plurality of mesh strands 451a and a plurality of mesh holes 451b. These mesh strands 451a can be numerous and fine, thereby defining hundreds or thousands of mesh holes 451b. Hereinafter, a current consumption process in the mesh structure 451 will be described.

As described above, a current discharged from the electrode assembly 10 when the conductive foreign material 90 sequentially penetrates the case 26 and the first electrode 11 may return to the conductive foreign material 90 by passing through the second terminal portion 40. This current path will be referred to as a short circuit current path. For instance, the second terminal plate 42 may only be electrically connected to the cap plate 20 via the auxiliary plate 45.

In further detail, the current discharged from the electrode assembly 10 may be passed through the auxiliary plate 45 where the mesh structure 451 is formed and then transmitted to the conductive foreign material 90 through the case 26. In this case, the current passing through the auxiliary plate 45 passes through the plurality of mesh strands 451a, each having a constant or uniform thickness. To this end, the auxiliary plate 45 may present a surface facing the second terminal plate 42 that is at least as large as a surface of the second terminal plate 42 facing the auxiliary plate 45.

Since the current passes through the mesh strands 451a in a line contact state, a relatively large amount of current can be consumed in the auxiliary plate 45 compared to a case of passing through a plate where the mesh structure 451 is not formed in a surface contact state. This is especially true with a large number (e.g., hundreds or thousands) of mesh holes 451b. Thus, the amount of current flowing from the electrode assembly 10 and returning to the conductive foreign material 90 may be reduced by the auxiliary plate 45 formed in the mesh structure 451. Accordingly, damage to the electrode assembly 10 due to heat or arcing generated in the conductive foreign material 90 can be reduced or prevented.

Figure 5A:
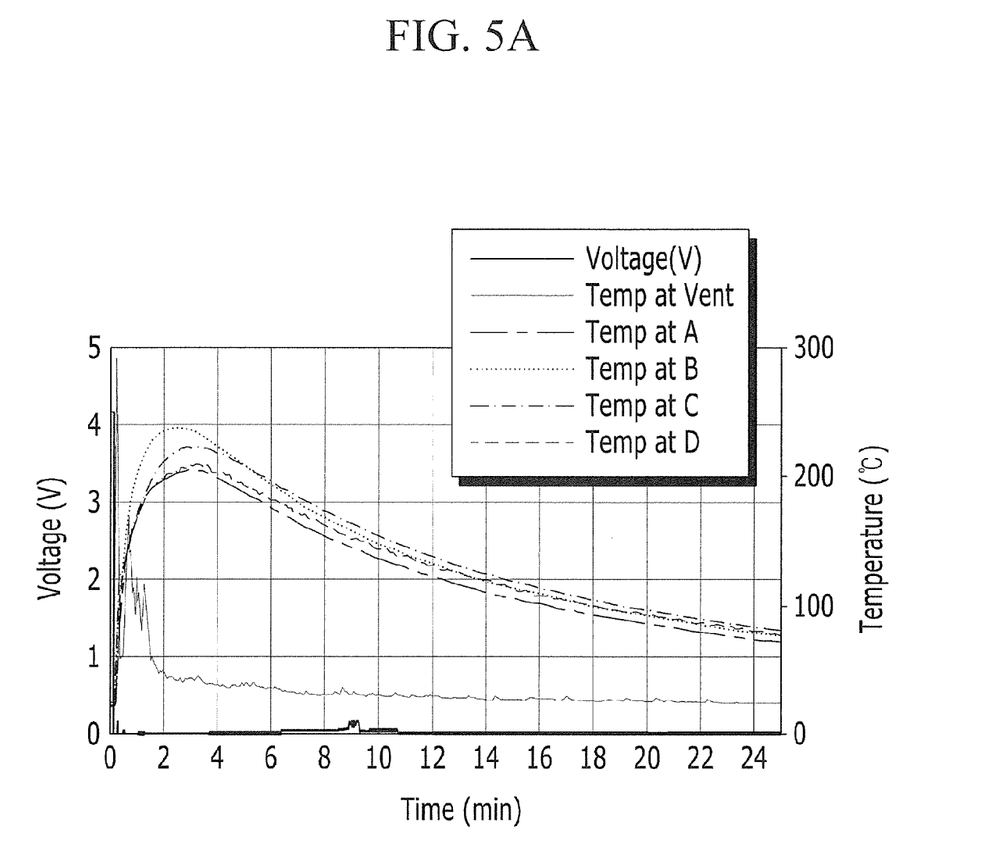
FIG. 5A is a graph illustrating internal temperature variation of a comparable rechargeable battery in accordance with penetration of a conductive material through the rechargeable battery.
Figure 5B:
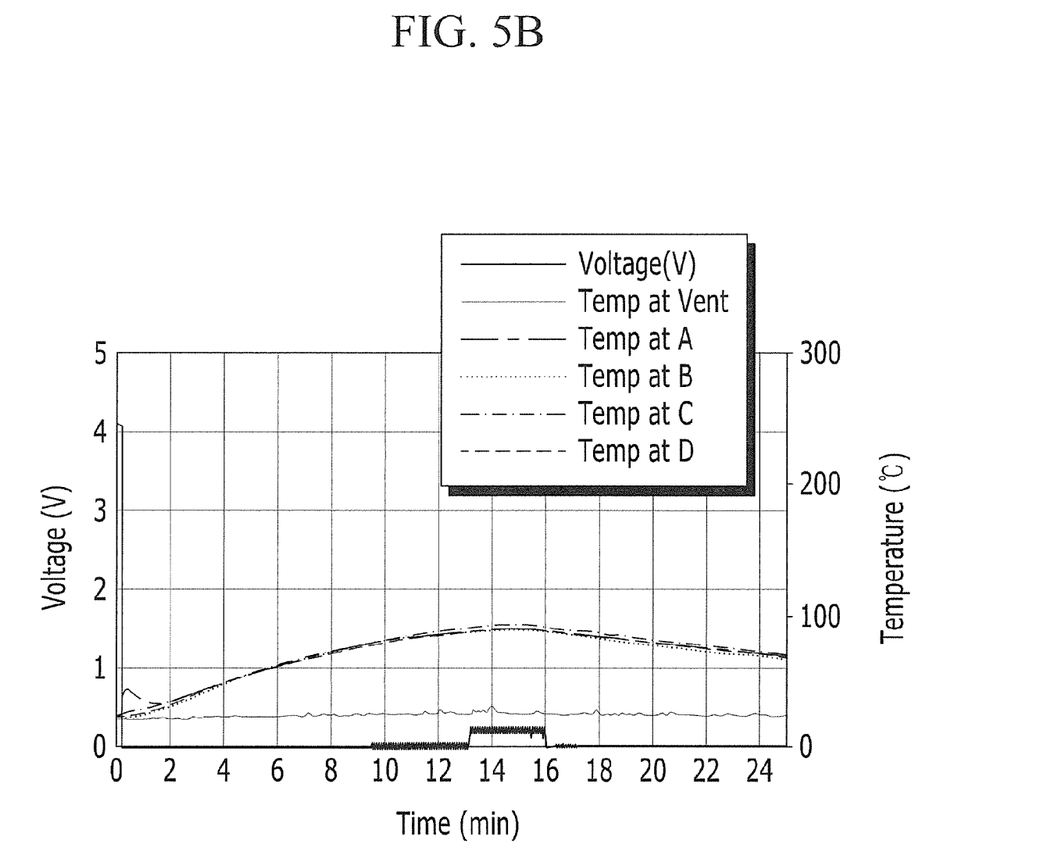
FIG. 5B is a graph illustrating internal temperature variation of the rechargeable battery of FIG. 1 in accordance with penetration of a conductive material through the rechargeable battery.

FIG. 5A is a graph illustrating internal temperature variation of a comparable rechargeable battery in accordance with penetration of a conductive foreign material through the comparable rechargeable battery. FIG. 5B is a graph illustrating internal temperature variation of the rechargeable battery of FIG. 1 in accordance with penetration of the conductive material through the rechargeable battery.

Referring back to the FIG. 2, according to the present exemplary embodiment, when conductive foreign material is completely penetrated through the rechargeable battery, an internal temperature of the rechargeable battery may be determined by measuring each of a temperature change of vent (Temp at VENT), a temperature change of a first part (A) (Temp at A), a temperature change of a second part (B) (Temp at B), a temperature change of a third part (C) (Temp at C) and a temperature change of a fourth part (D) (Temp at D)

Referring to FIG. 5A, a voltage V is instantaneously increased up to 4.166V when the conductive foreign material is completely penetrated through the comparable rechargeable battery, and according to the temperature change of the second part (B) (Temp at B), an internal temperature of the comparable rechargeable battery is increased up to 237° C. In contrast, referring to FIG. 5B, although it is the same as the comparable rechargeable battery in that a voltage is instantaneously increased up to 4.166V when the conductive foreign material is penetrated through the rechargeable battery according to the present exemplary embodiment of FIG. 1, according to the temperature change of the second part (B) (Temp at B), the internal temperature of the rechargeable battery 100 is only increased up to 95° C.

Thus, according to the present exemplary embodiment of FIG. 1, the current discharged from the electrode assembly 10 linearly contacts the auxiliary plate 45 of the second terminal portion 40 when passing therethrough due to the mesh structure 451. Thus, consumption of the current occurs, and accordingly the amount of current returning to the conductive foreign material 90 is significantly reduced, thereby suppressing an increase of the internal temperature of the electrode assembly 10.

Figure 6:
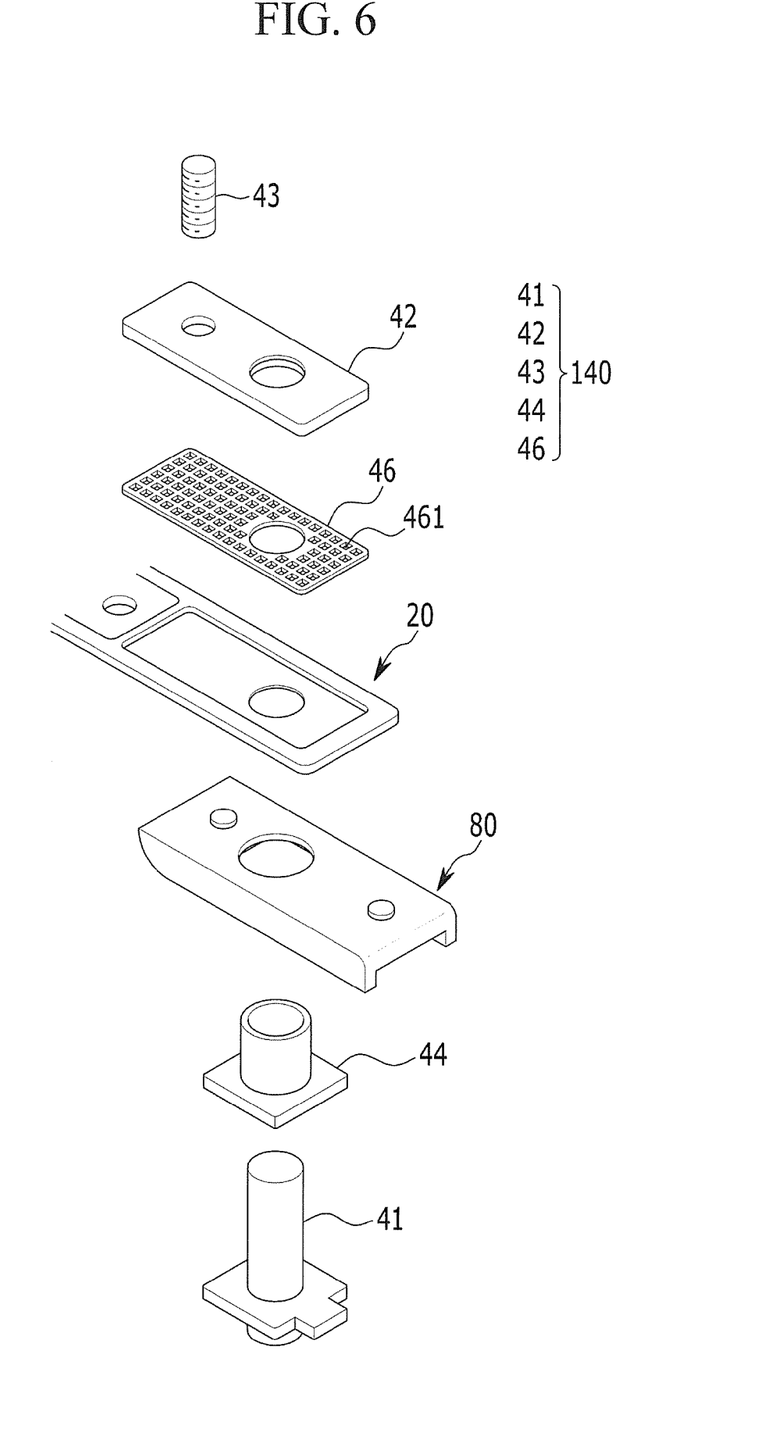
FIG. 6 is a partially exploded perspective view of a rechargeable battery according to a second exemplary embodiment of the present invention.

FIG. 6 is a partially exploded perspective view of a rechargeable battery according to a second exemplary embodiment of the present invention.

Referring to FIG. 6, a second terminal portion 140 of the rechargeable battery is substantially the same as the second terminal portion 40 of the rechargeable battery 100 of the exemplary embodiment of FIG. 1, except for an auxiliary plate 46 of the second terminal portion 140. Thus, a portion that is the same as the second terminal portion 40 according to the exemplary embodiment of FIG. 1 will not be repeated.

The auxiliary plate 46 of the second terminal portion 140 may include a plurality of grooves 461 (including top portions and recessed portions), and each of the plurality of grooves 461 may have a cross-section formed in the shape of a quadrangle. However, the cross-section of each of the grooves 461 formed in the auxiliary plate 46 is not limited to the shape of a quadrangle, and the shape of the cross-section may be, for example, one of a circle or a triangle.

There may be numerous such grooves 461 (for example, dozens or hundreds, such as 50 or more) to increase the current consumption of the auxiliary plate 46 in a short circuit current path. In addition, the top portions of the grooves 461 may form a level mating surface to face the second terminal plate 42 (to increase surface contact between the auxiliary plate 46 and the second terminal plate 42 and widen the current path between the second terminal plate 42 and the auxiliary plate 46). The auxiliary plate 46 may also mate flush with the second terminal plate 42 or present a surface facing the second terminal plate 42 that is at least as large as a surface of the second terminal plate 42 facing the auxiliary plate 46, for instance, to accomplish the same purposes. Further, the auxiliary plate 46 may mate flush with the cap plate 20 or have a level mating surface facing the cap plate as other ways to increase surface contact in the parts that make up the short circuit current path.

According to the present exemplary embodiment of FIG. 6, when the conductive foreign material 90 sequentially penetrates the case 26 and the first electrode 11 and thus, the current discharged from the electrode assembly 10 returns to the conductive foreign material 90 passing through the auxiliary plate 46 of the second terminal portion 140, the current may linearly contact the auxiliary plate 46 where the plurality of grooves 461 of the second terminal portion 140 are formed. Since the current passes through the auxiliary plate 46 while linearly contacting the auxiliary plate 46, much more current can be consumed in the auxiliary plate 46 compared to a case that the current linearly contacts a plate where the grooves 461 are not formed.

That is, the amount of current returning to the conductive foreign material 90 may be reduced due to the auxiliary plate 46 where the plurality of grooves 461 is formed. Accordingly, damage to the electrode assembly due to heat or arcing generated in the conductive foreign material 90 can be reduced or prevented.

Figure 7:
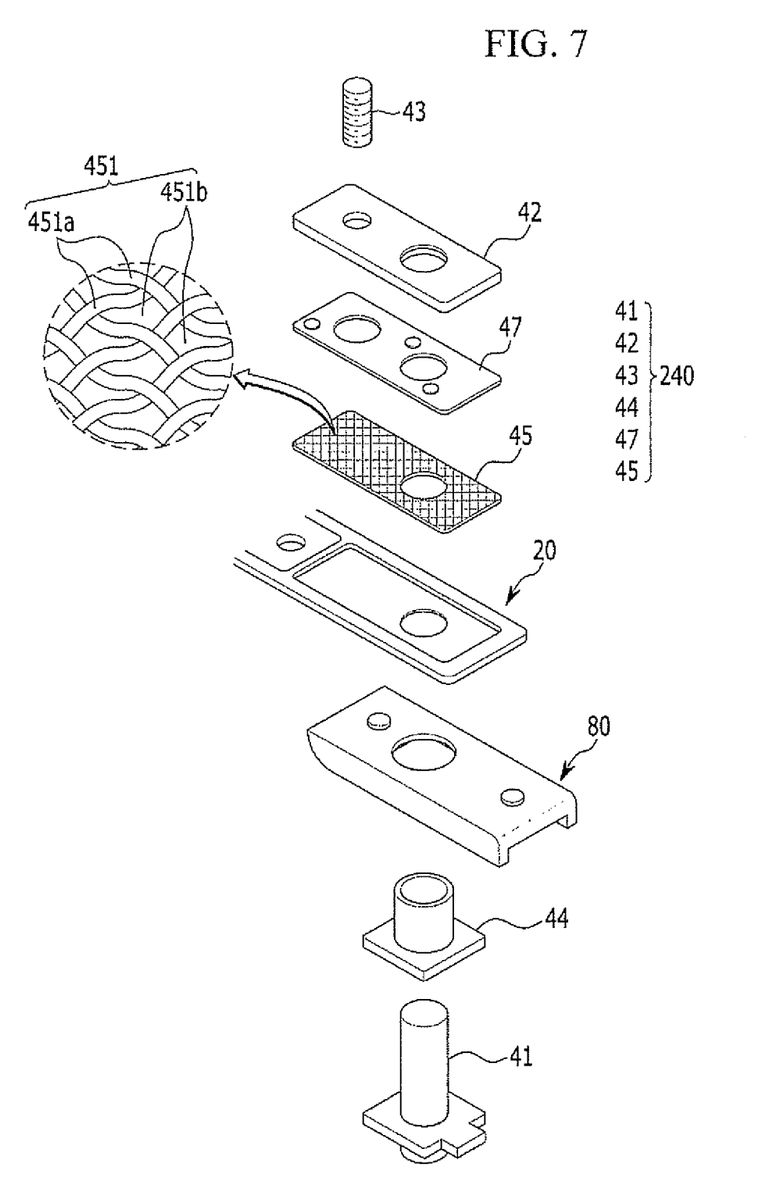
FIG. 7 is a partially exploded perspective view of a rechargeable battery according to a third exemplary embodiment of the present invention.

FIG. 7 is a partially exploded perspective view of a rechargeable battery according to a third exemplary embodiment of the present invention.

Referring to FIG. 7, a rechargeable battery has the same configuration of the rechargeable battery 100 of the exemplary embodiment of FIG. 1, except for a reinforcing plate 47 of a second terminal portion 240. Thus, a portion that is the same as the second terminal portion 40 of the exemplary embodiment of FIG. 1 will not be repeated.

The second terminal portion 240 may further include a reinforcing plate (or reinforcement plate) 47 provided between a second terminal plate 42 and an auxiliary plate 45. A mechanical strength of the auxiliary plate 45 including a mesh structure 451 may be weaker than a mechanical strength of a plate that does not include a mesh structure. Thus, the reinforcing plate 47 may be provided between the second terminal plate 42 and the auxiliary plate 45 to reinforce the mechanical strength of the auxiliary plate 45.

For example, the reinforcing plate 47 can reduce the likelihood or prevent the mesh structure 451 of the auxiliary plate 45 from being damaged. In addition, heat generated in the auxiliary plate 45 may be absorbed into (or dissipated by) the reinforcing plate 47 by the current discharged from the electrode assembly 10, and therefore damage to the auxiliary plate 45 due to the heat can be reduced or prevented. The reinforcement plate 47 may mate flush with the second terminal plate 42 to increase or maximize surface contact between the reinforcement plate 47 and the second terminal plate 42.

In other embodiments, the reinforcing plate 47 may be provided between the auxiliary plate 45 and a cap plate 20 instead of being provided between the second terminal plate 42 and the auxiliary plate 45. Further, the reinforcing plate 47 may be formed of one of a conductive material and a non-conductive material.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

| Description of some symbols | |
|---|---|
| 100: rechargeable battery | 10: electrode assembly |
| 11: first electrode | 12: second electrode |
| 13: separator | 30: first terminal portion |
| 31: first rivet | 32: first terminal plate |
| 33: first terminal connection pillar | 34: first gasket |
| 35: terminal insulation member | |
| 40, 140, 240: second terminal portion | |
| 41: second rivet | 42: second terminal plate |
| 43: second terminal connection pillar | 44: second gasket |
| 45, 46: auxiliary plate | 451: mesh structure |
| 451a: mesh strand | 451b: mesh hole |
| 461: groove | 47: reinforcing plate |
| 50: first current collecting member | |
| 51: first electrode combining portion | |
| 52: first terminal combining portion | |
| 60: first lower insulation member | |
| 61: first current collecting member combining unit | |
| 70: second current collecting member | |
| 80: second lower insulation member | |

What is claimed is:

1. A rechargeable battery for supplying electrical power and comprising:
   a case having a first polarity;
   an electrode assembly in the case and comprising a first electrode having the first polarity and a second electrode having a second polarity different from the first polarity;
   a cap plate sealing an opening of the case, electrically connecting the case to the first electrode, and having the first polarity; and
   a terminal portion attached to the cap plate, the terminal portion comprising:
      a terminal plate on the cap plate for supplying the electrical power along an electrical power current path, the terminal plate being electrically connected to the first electrode along the electrical power current path and having the first polarity; and
      an auxiliary plate electrically connecting the cap plate to the terminal plate along a short circuit current path when the rechargeable battery is penetrated by a conductive foreign material, the auxiliary plate having a plurality of openings for reducing a current flow along the short circuit current path.

2. The rechargeable battery of claim 1, wherein a surface of the auxiliary plate facing the terminal plate is at least as large as a surface of the terminal plate facing the auxiliary plate.

3. The rechargeable battery of claim 1, wherein the terminal plate has a level mating surface facing the cap plate.

4. The rechargeable battery of claim 1, wherein the auxiliary plate has a level mating surface facing the cap plate.

5. The rechargeable battery of claim 1, wherein the terminal plate is only electrically connected to the cap plate via the auxiliary plate.

6. The rechargeable battery of claim 1, wherein the terminal plate is a positive terminal plate and electrically connected to the case.

7. The rechargeable battery of claim 1, wherein the terminal portion further comprises:
   a terminal member electrically connecting the terminal plate to the electrode assembly; and
   a terminal gasket electrically insulating the terminal member from the cap plate except via the terminal plate.

8. The rechargeable battery of claim 1, wherein the auxiliary plate is electrically connected to the case.

9. The rechargeable battery of claim 8, wherein the short circuit current path is between the case and the electrode assembly.

10. The rechargeable battery of claim 1, wherein the plurality of openings are grooves in the auxiliary plate.

11. The rechargeable battery of claim 10, wherein
   the grooves comprise top portions and recessed portions, and
   the top portions form a level mating surface facing the terminal plate.

12. The rechargeable battery of claim 10, wherein the auxiliary plate mates flush with the terminal plate.

13. The rechargeable battery of claim 10, wherein the auxiliary plate mates flush with the cap plate.

14. The rechargeable battery of claim 1, wherein the plurality of openings are holes in the auxiliary plate.

15. The rechargeable battery of claim 14, wherein the auxiliary plate has a mesh structure.

16. The rechargeable battery of claim 15, wherein the mesh structure comprises a plurality of mesh strands defining the holes.

17. The rechargeable battery of claim 15, wherein the terminal portion further comprises a reinforcement plate for reinforcing a mechanical strength of the mesh structure.

18. The rechargeable battery of claim 17, wherein the reinforcement plate is configured to dissipate heat generated in the mesh structure.

19. The rechargeable battery of claim 17, wherein the reinforcement plate is between the auxiliary plate and the terminal plate.

20. The rechargeable battery of claim 19, wherein the reinforcement plate mates flush with the terminal plate.

* * * * *